United States Patent [19]

Perkins

[11] Patent Number: 4,800,429

[45] Date of Patent: Jan. 24, 1989

[54] AUTO SYNC POLARITY CONTROL CIRCUIT FOR USE WITH MONITOR

[75] Inventor: Geoffrey W. Perkins, Chandler, Ariz.

[73] Assignee: Motorola, Inc., Schaumburg, Ill.

[21] Appl. No.: 168,108

[22] Filed: Mar. 14, 1988

[51] Int. Cl.⁴ .............................................. H04N 5/04
[52] U.S. Cl. .................................... 358/148; 358/150
[58] Field of Search ............... 358/153, 148, 150, 154; 340/814; 328/139, 118, 140

[56] References Cited

U.S. PATENT DOCUMENTS

| 4,460,918 | 7/1984 | Flasza | 358/181 |
| 4,583,119 | 4/1986 | Roscoe | 358/150 |
| 4,709,267 | 11/1987 | Sendelweck | 358/153 |

*Primary Examiner*—James J. Groody
*Assistant Examiner*—David E. Harvey
*Attorney, Agent, or Firm*—Michael D. Bingham

[57] ABSTRACT

A control circuit for use with personal computer monitors automatically provides single polarity horizontal and vertical sync pulses from either TTL or analog composite sync signals supplied from any of a variety of personal computers. The control circuit has both a vertical and horizontal sub-circuit each including an integrator and an exclusive OR gate wherein the inputs of the latter are coupled respectively to the input and the output of the former. Additionally the vertical sub-circuit includes a second exclusive gate the output of which is coupled to the input of the integrator thereof and whose inputs are respectively coupled to the output of the integrator of the horizontal sub-circuit and an input to which is supplied vertical TTL sync input signals while either horizontal TTL sync or TTL sync input signals are supplied to the input of the horizontal sub-circuit. In operation the control circuit defaults to the analog composite sync input in the absence of TTl horizontal or composite sync input signals. The analog composite circuit separates the horizontal and vertical sync information and applies the same to the integrator of the horizontal sub-circuit.

7 Claims, 1 Drawing Sheet

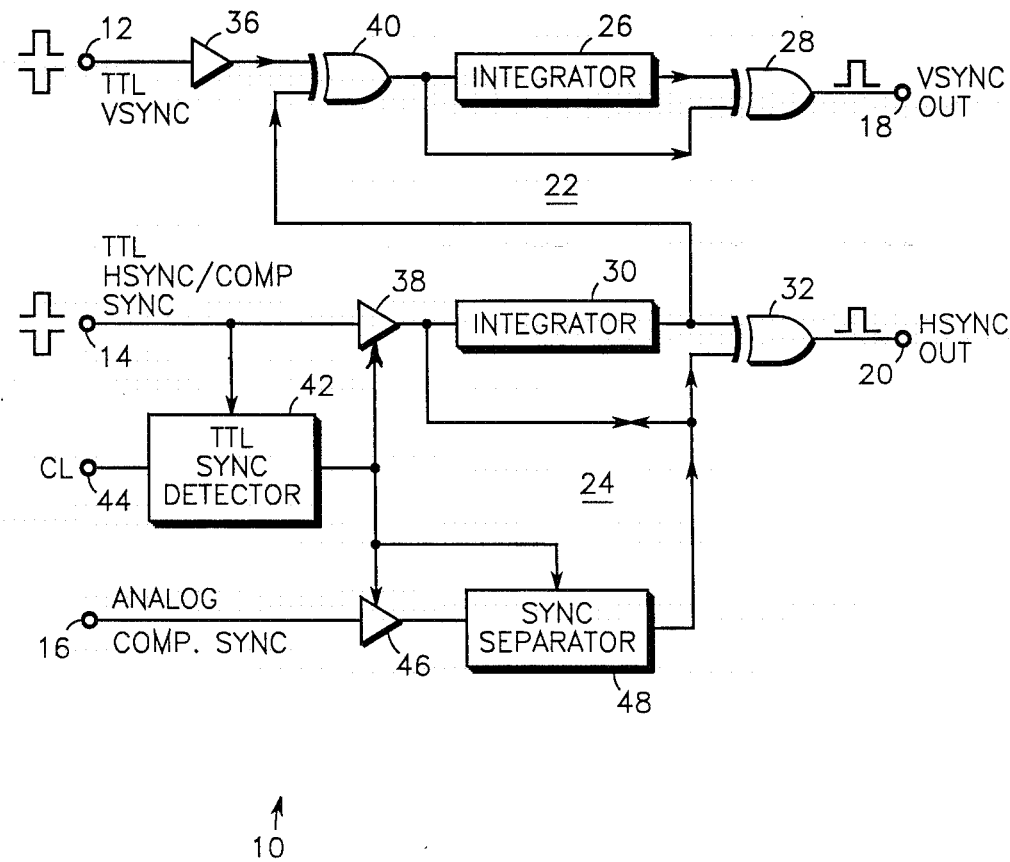

AUTO SYNC POLARITY CONTROL CIRCUIT FOR USE WITH MONITOR

BACKGROUND OF THE INVENTION

The present invention is related to monitors and, more particularly, to a auto sync circuit for use in a personal computer (PC) monitor to provide the latter compatibility with the variety of graphic output signals supplied from different manufacturers PC's.

Different PC's provide different graphic output signals for driving a monitor. For example, a PC may supply separate TTL horizontal and vertical sync pulses of either negative or positive polarities, a TTL composite sync output of either polarity or even analog RGB sync outputs. It is desirable that a monitor be able to receive these different graphic outputs so that it is compatible with any PC.

There is at least one prior art monitor that provides compatibility with the different graphic output signals discussed above. One disadvantage of this prior art monitor is that a mechanical switch and discrete components are required for switching the monitor between TTL sync and analog composite sync input signals.

It is desirable to provide true automatic multisync compatibility by eliminating the need for mechanical switching while reducing discrete component count.

SUMMARY OF THE INVENTION

Accordingly it is an object of the present invention to provide an improved auto sync polarity control circuit.

It is another object of the present invention to provide an improved auto sync polarity integrated control circuit.

Still another object of the present invention is to provide an auto sync control circuit for use with a PC monitor system.

In accordance with the above and other objects there is provided a control circuit which is adapted to receive TTL sync and TTL composite sync pulses of either positive or negative polarity as well as analog composite sync information for providing horizontal and vertical sync pulses of a single polarity at respective outputs thereof which comprises a horizontal sync circuit subsystem for providing the single polarity horizontal sync pulses, a vertical sync circuit for providing the single polarity vertical sync pulses, each of the horizontal and vertical sync circuit subsystems including an integrator and an exclusive gate circuit having an output coupled to a respective output of the control circuit and first and second inputs coupled respectively to the input and the output of the integrator wherein the vertical sync circuit subsystem further includes an additional exclusive gate circuit having an output coupled to the input of the integrator thereof and first and second inputs coupled respectively to the TTL vertical input terminal of the control circuit and the output of the integrator comprising the horizontal sync circuit subsystem; a circuit subsystem adapted to receive analog sync information signals for providing separated horizontal and vertical sync pulses at an output thereof that is coupled to the input of the integrator of the horizontal sync circuit subsystem; and detector circuit responsive to TTL sync input signals being applied to horizontal sync circuit subsystem for disabling the analog circuit subsystem.

BRIEF DESCRIPTION OF THE DRAWING

The single FIG. is a partial block and schematic diagram illustrating the auto sync polarity control circuit of the present invention.

DETAILED DESCRIPTION OF THE PREFERRED EMBODIMENT

Turning to the sole figure there is shown auto sync polarity control circuit 10 of the present invention. It is understood that control circuit 10 may be manufactured in integrated circuit form using conventional bipolar integrated fabrication processes. Control circuit 10 is adapted to receive TTL vertical sync input signals at input 12, either TTL horizontal sync input signals or TTL composite sync signals at input 14 and analog sync information at input 16. Control circuit 10 is intended to be included in a multisync monitor for supplying graphics information which is compatible to most, if not all, PC's. The sync information, either TTL or analog, is supplied from the PC to the inputs of control circuit 10 as is well understood. Control circuit 10, as will be explained, provides single polarity vertical and horizontal sync pulses at respective outputs 18 and 20 regardless of the polarity of the supplied TTL input sync pulses supplied to inputs 12 and 14.

Control circuit 10 automatically adapts to the polarity, form and source of the synchronizing pulses supplied at the inputs thereof. This source may either be separate vertical and horizontal TTL sync pulses supplied to inputs 12 and 14 or TTL composite sync pulses supplied to input 14 only or an analog composite video signal containing composite sync information, usually on the green video sync, from an RGB output of a PC.

The correction of the polarity of the inputted TTL sync signals, either individual vertical/horizontal or composite sync is provided by the basic integrator exclusive OR gate circuit configuration comprising each of the vertical and horizontal sync subsystem circuits 22 and 24. Hence, vertical subsystem 22 has an integrator circuit 26 having an output coupled to one input of exclusive gate circuit 28 the other input of which is coupled to the input of the integrator. Similarly, horizontal sync subsystem 24 includes integrator 30 having an output coupled to one input of exclusive OR gate circuit 32 the other input of which is coupled to the input of the integrator. The operation of integrator 30 is fast in comparison with integrator 26 as the frequency of the horizontal sync input is much greater than the vertical sync input signal frequency. The basic integrator-exclusive OR gate configuration provides a single polarity output pulse at the output of the gate regardless of the polarity of the pulse supplied at the input of the integrator. The manner in which this function is accomplished is explained below.

As is known, whenever the logic inputs to an exclusive OR gate are opposite the output of the gate is high. Moreover, the integrators will provide a mean DC voltage level of the applied input sync pulses supplied to the input thereof at the output. Thus, for example, if the TTL vertical sync pulses supplied via buffer amplifier 36 to the input of integrator 26 are positive, a low voltage is applied to the one input of the OR gate from the integrator while the other input is high. Hence, a positive polarity pulse is suppled at output 18. Likewise, if the polarity of the sync pulses supplied both to the input of integrator 26 and the connected input of gate 28 are negative a high voltage level is supplied at the output of the integrator to the other input of the gate. Since the inputs of gate 28 are different a positive pulse is again supplied at output 18. Thus, no matter what polarity of applied sync pulses, a single polarity pulse is provided at the output of the exclusive gate (either gate 28 or 32).

As described above, single polarity vertical sync pulses are provided at output 18 regardless of the polarity of the TTL vertical sync pulses applied to input 12. Similarly, single polarity horizontal sync pulses are produced at output 20 regardless of the polarity of the TTL horizontal sync pulses supplied to input 14 and via buffer amplifier 38 to the input of integrator 30.

In the case of those PC's that provide only TTL composite sync pulse information at input 14, control circuit 10 will automatically provide single polarity vertical and horizontal sync pulses at outputs 18 and 20. During the horizontal sync portion of the TTL composite signal horizontal subsystem circuit 24 will function as described above to provide the horizontal sync pulses at output 20. Because integrator 30 has a much smaller rise time than integrator 26, the vertical sync pulses comprising the TTL composite sync information supplied to input 14 appear at the output of integrator 30 and are applied to the second input of exclusive OR gate 40. As the first input of gate 40 is at some DC value during this time the vertical sync pulses are passed to the input of integrator 26. Operation of subsystem 22 is as described above such that single polarity vertical sync pulses are provided at output 18 corresponding to the vertical sync pulses of the TTL composite sync information applied to input 14.

In normal operation, control circuit 10 automatically defaults to looking at the input applied to input terminal 16. As long as an analog composite signal is applied to input 16 or in the absence of either TTL horizontal sync pulses or TTL composite sync signals, TTL sync detector 42 will provide a control signal that disables buffer amplifier 38 while enabling buffer amplifier 46. With buffer amplifier 46 enabled the analog composite sync information will be applied to the input of sync separator 48. Sync separator 48, which is conventional in the art, provides both horizontal and vertical sync pulses to both the input of integrator 30 and the second input of gate 32. The vertical sync pulses are applied via integrator 30 to the one input of gate 40 as previously described for the operation of applied TTL composite sync and appear at output 18 while the separated horizontal sync pulses appear at output 20.

In the presence of either TTL horizontal sync or TTL composite sync, detector 42 will disable amplifier 46 and enable amplifier 38. Detector 42 is comprised of a counter including a plurality of set/reset flip-flops and receives a clocking signal at input 44. The clocking signal may be provided from a time base oscillator of the PC monitor system in which control circuit is intended to be included.

As previously mentioned, the analog composite sync signal is identical to a standard television color composite signal with the horizontal and vertical sync information being provide on the green video sync signal.

Thus, what has been described above is a sync control circuit for use in a PC monitor system that automatically adjusts to a variety of PC graphic output signals by electronically switching from an analog input mode to a TTL input mode without requiring the use of a mechanical switch.

I claim:

1. Circuit for providing single polarity pulses at first and second outputs in response to receiving applied digital input signals, comprising:
   first circuit means responsive to either positive or negative applied input signals for providing single polarity pulses at the first circuit output including a first integrator having an input coupled to a first input of the circuit and an output; and a first gate circuit having an output coupled to the first circuit output, a first input coupled to said input of said first integrator and a second input coupled to said output of said first integrator; and
   second circuit means responsive to either negative or positive input signals for providing single polarity pulses at the second circuit output including a second integrator having an input and an output; a second gate circuit having an output coupled to the second circuit output, a first input coupled to said output of said second integrator, and a second input coupled to said input of said second integrator; and a third gate circuit having an output coupled to said input of said second integrator, a first input coupled to a second input of the circuit and a second input coupled to said output of said first integrator.

2. The circuit of claim 1 including:
   third circuit means having an input coupled to a third input of the circuit to which are supplied analog composite signals for providing corresponding digital output signals and an output coupled both to said output of said first integrator and said first input of said first gate circuit; and
   fourth circuit means for enabling said third circuit means while electrically decoupling said input of said first integrator from said first input of the circuit in the absence of digital signals being applied to said first input of the circuit and disabling said third circuit means while electrically coupling said input of said first integrator to said first input of the circuit in the presence of said applied digital signals.

3. The circuit of claim 2 wherein said first, second and third gate circuits are exclusive OR gates.

4. A control circuit for automatically providing horizontal and vertical single polarity sync pulses at respective outputs, comprising:
   first circuit means having an input coupled to a first input of the control circuit to which TTL horizontal or composite sync signals are supplied, said first circuit means including a first integrator having an input coupled to said first input of the control circuit and an output, and a first gate circuit having a first input coupled to said output of said first integrator, a second input coupled to said input of said first integrator and an output coupled to a first one of the outputs of the control circuit; and
   second circuit means having an input coupled to a second input of the control circuit to which TTL vertical sync signals are supplied, said second circuit means including a second integrator having an input and an output, a second gate circuit having a first input coupled to said second input of the control circuit, a second input coupled to said output of said first integrator and an output coupled to said input of said second integrator, and a third gate circuit having a first input coupled to said output of said second integrator, a second input coupled to said input of said second integrator and an output coupled to a second one of the outputs of the control circuit.

5. The control circuit of claim 4 including:

third circuit means coupled to a third input of the control circuit to which are supplied analog composite sync signals for providing vertical and horizontal sync signals at an output thereof, said output being coupled both to said input of said first integrator and said second input of said first gate circuit; and detector means having an input coupled to said first input of the control circuit for enabling said third circuit means during operation of the control circuit while electrically decoupling said first circuit means from said first input of the control circuit in the absence of TTL signals applied to said first input of the control circuit and disabling said third circuit means while electrically coupling said first circuit means to said first input of the control circuit when the TTL signals are supplied to said first input of the control circuit.

6. The control circuit of claim 5 wherein said first, second and third gate circuits are exclusive OR gates.

7. The control circuit of claim 5 wherein the rise time of said first integrator is less than the rise time of said second integrator.

* * * * *

UNITED STATES PATENT AND TRADEMARK OFFICE
CERTIFICATE OF CORRECTION

PATENT NO. : 4,800,429

DATED : January 24, 1989

INVENTOR(S) : Geoffrey W. Perkins

It is certified that error appears in the above-identified patent and that said Letters Patent is hereby corrected as shown below:

Column 4, claim 2, line 31, please delete "output" and insert therefor --input--.

Signed and Sealed this

Twenty-third Day of October, 1990

Attest:

HARRY F. MANBECK, JR.

*Attesting Officer*     *Commissioner of Patents and Trademarks*